United States Patent
Yang et al.

(10) Patent No.: US 11,073,602 B2
(45) Date of Patent: Jul. 27, 2021

(54) TIME OF FLIGHT USER IDENTIFICATION BASED CONTROL SYSTEMS AND METHODS

(71) Applicant: STMicroelectronics, Inc., Coppell, TX (US)

(72) Inventors: Xiaoyong Yang, San Jose, CA (US); Rui Xiao, San Jose, CA (US)

(73) Assignee: STmicroelectronics, inc., Coppell, TX (US)

( * ) Notice: Subject to any disclaimer, the term of this patent is extended or adjusted under 35 U.S.C. 154(b) by 1078 days.

(21) Appl. No.: 15/624,346

(22) Filed: Jun. 15, 2017

(65) Prior Publication Data

US 2017/0363721 A1    Dec. 21, 2017

Related U.S. Application Data

(60) Provisional application No. 62/350,524, filed on Jun. 15, 2016.

(51) Int. Cl.
    *G01C 3/08*      (2006.01)
    *G01S 7/481*     (2006.01)
    (Continued)

(52) U.S. Cl.
    CPC .......... *G01S 7/4816* (2013.01); *G01S 7/4802* (2013.01); *G01S 7/4863* (2013.01); *G01S 17/10* (2013.01);
    (Continued)

(58) Field of Classification Search
    CPC ...... G01S 7/4816; G01S 17/10; G01S 7/4802; G01S 7/4863; G01S 17/89; G07C 9/25; G07C 9/00
    See application file for complete search history.

(56) References Cited

U.S. PATENT DOCUMENTS 5,703,367 A * 12/1997 Hashimoto ........ G06K 9/00369
                                                                                  250/342
8,948,501 B1 * 2/2015 Kim .................... G06K 9/00711
                                                                                   382/159

(Continued)

FOREIGN PATENT DOCUMENTS

| GB | 2530404 A | 3/2016 |
|---|---|---|
| WO | 2014/113728 A1 | 7/2014 |
| WO | 2016/118111 A1 | 7/2016 |

OTHER PUBLICATIONS

VL53L0X, "World's smallest Time-of-Flight ranging and gesture detection sensor". ST life.augmented, Datasheet—production data. https://www.st.com/resource/en/datasheet/vl53l0x.pdf. May 30, 2016. (Year: 2016).*

People Counter, "PC M4.0". iEE a sense for innovation. https://www.iee-sensing.com/media/5d8b3a0497c65_180816-fs-people-counter-en-m3s.pdf. Aug. 24, 2012. (Year: 2012).*

(Continued)

*Primary Examiner* — Samantha K Abraham
(74) *Attorney, Agent, or Firm* — Seed Intellectual Property Law Group LLP

(57) ABSTRACT

A user identification based control system includes a time of flight ranging sensor configured to sense a distance to a person, where the time of flight ranging sensor is positioned so the sensed distance is a function of a height of the person. Processing circuitry is coupled to the time of flight ranging sensor and configured to identify the person based upon sensed distance and to generate control signals to control peripheral components based upon the identity of the person. The time of flight ranging sensor may also be used to sense speed of the person for identification purposes. In general, the time of flight ranging sensor is positioned a known height over a surface on which the person is present, such as in the doorway or on a ceiling of a room.

21 Claims, 10 Drawing Sheets

(51) Int. Cl.
  *G01S 17/89*   (2020.01)
  *G01S 17/10*   (2020.01)
  *G01S 7/48*   (2006.01)
  *G07C 9/00*   (2020.01)
  *G01S 7/4863*   (2020.01)
  *G07C 9/25*   (2020.01)

(52) U.S. Cl.
  CPC ............... *G01S 17/89* (2013.01); *G07C 9/00* (2013.01); *G07C 9/25* (2020.01)

(56) References Cited

U.S. PATENT DOCUMENTS

| | | | | |
|---|---|---|---|---|
| 2009/0108184 A1* | 4/2009 | Iwasawa | ............... | G01S 17/04 250/216 |
| 2009/0112461 A1* | 4/2009 | Murphy | ............... | G01C 21/20 701/532 |
| 2009/0193055 A1* | 7/2009 | Kuberka | ............... | G06F 16/51 |

OTHER PUBLICATIONS

Bai, Ying-Wen and Yi-Te Ku. "Automatic Room Light Intensity Detection and Control Using a Microprocessor and Light Sensors". https://ieeexplore.ieee.org/stamp/stamp.jsp?tp=&arnumber=4637603. Oct. 7, 2008. (Year: 2008).*

Lutron, "Occupancy/Vacancy Sensor", Design and Application Guide. https://www.lutron.com/TechnicalDocumentLibrary/3683197.pdf. Jul. 2014. (Year: 2014).*

Yun, Jaeseok and Sang-Shin Lee. Human Movement Detection and Idengification Using Pyroelectric Infrared Sensors, https://www.ncbi.nlm.nih.gov/pmc/articles/PMC4063065/. May 5, 2014. (Year: 2014).*

Theben energy saving comfort. "Presence and Motion Detectors", https://image.schrack.com/produktkataloge/k-theb1en6.pdf. Sep. 15, 2011. (Year: 2011).*

Kim, et al., "A Survey and Proposed Framework on the Soft Biometrics Technique for Human Identification in Intelligent Video Surveillance System" (2012). http://downloads.hindawi.com/journals/bmri/2012/614146.pdf (Year: 2012).*

* cited by examiner

TIME OF FLIGHT USER IDENTIFICATION BASED CONTROL SYSTEMS AND METHODS

BACKGROUND

Technical Field

The present disclosure relates generally to user identification for use in electronic systems, and is directed more specifically to user identification through time-of-flight sensing and control of electronic systems based upon the user identification.

Description of the Related Art

In current context aware smart systems in the Internet of Things applications, such as in smart home, smart office, and smart city applications, user identification, counting and tracking is desirable in many situations. In a smart home application, for example, it may be advantageous for a smart home control system to have information about the number of people in a room and an identity of those people. The smart home control system could then control components of the control system based upon the identity and number of people in a given room. For example, the control system could control lighting, music, and heating and cooling systems based upon the detected identity and number of people in a room. Current smart home control systems may identify people through fingerprint scans, iris scans, or face recognition utilizing images captured by a suitable image capture device such as a camera.

Existing solutions for identifying and tracking users are relatively complicated and expensive. Infrared sensors are relatively inexpensive and are thus used to detect the presence of a person or people in a room, but the utilization of such sensing is not reliable. This is due to the inherent characteristics of infrared sensing. For example, the variable characteristics of people to be detected, as the color of a person's hair, the color of the clothing a person is wearing, and so on, affect the reliability of infrared sensing since infrared sensing depends on the reflectance of an object being sensed. There is a need for improved techniques for identifying people, as well as tracking the movement of such people, to provide more reliable and sophisticated control and operation of context aware smart systems in a variety of applications.

BRIEF SUMMARY

Embodiments of the present disclosure are directed to methods and systems of identifying a user for use in context aware smart systems, such as in smart home, smart office, and smart city applications. In one embodiment, a user identification based control system includes a time of flight ranging sensor configured to sense a distance to a person, where the time of flight ranging sensor is positioned so the sensed distance is a function of a height of the person. Processing circuitry is coupled to the time of flight ranging sensor and configured to identify the person based upon sensed distance and to generate control signals to control peripheral components based upon the identity of the person. The time of flight ranging sensor has a field of view and in one embodiment the processing circuitry is further configured to determine a speed of the person based upon a duration that the sensed distance to the person is present in the field of view. The processing circuitry then identifies the person based upon the determined speed. In general, the time of flight ranging sensor is positioned a known height over a surface on which the person is present, such as in the doorway or on a ceiling of a room. The time of flight sensor senses distances to multiple persons in some embodiments of the present disclosure.

BRIEF DESCRIPTION OF THE SEVERAL VIEWS OF THE DRAWINGS

The foregoing and other features and advantages will become apparent from the following detailed description of embodiments, given by way of illustration and not limitation with reference to the accompanying drawings, in which.

DETAILED DESCRIPTION

Figure 1:
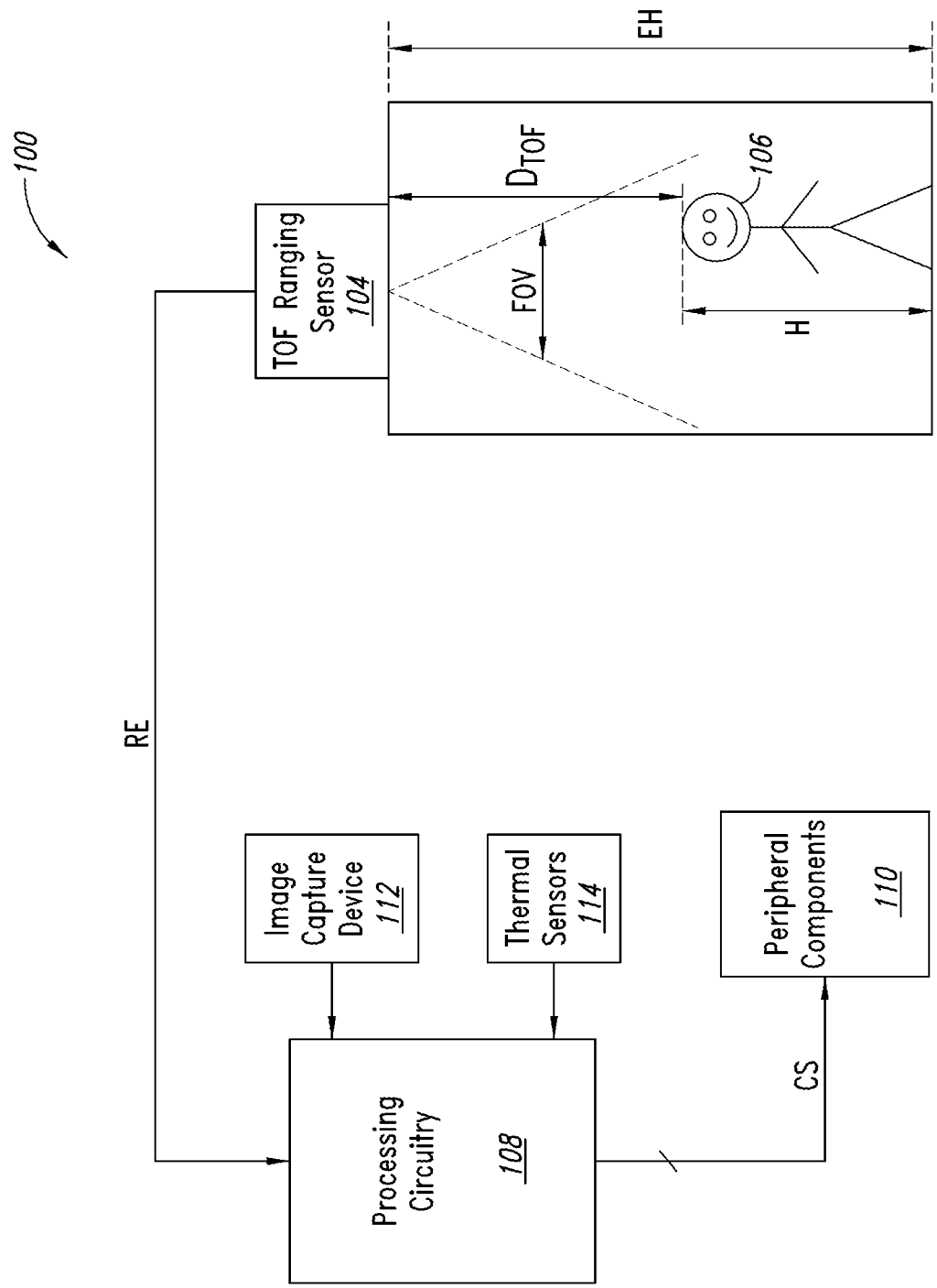
FIG. 1 is a functional block diagram of a user identification control system according to one embodiment of the present disclosure.

FIG. 1 is a functional block diagram of a user identification based control system 100 according to one embodiment of the present disclosure. The user identification based control system 100 is implemented in an entranceway 102 of a room (not shown) and includes a time-of-flight (TOF) ranging sensor 104 positioned at a top of the entranceway. The entranceway 102 may, for example, be a door or a hallway leading to a room. In operation, the TOF ranging sensor 104 transmits optical pulses into a field of view FOV within the entranceway 102 and detects return optical pulses in the field of view that are reflected back by a person 106 passing through the entranceway either into or out of the associated room. The TOF ranging sensor 104 detects a distance $D_{TOF}$ between the sensor and the person 106 in the entranceway 102 based on a time of flight of the optical pulse signals 106, and generates a range estimation signal RE indicating the detected distance. Processing circuitry 108 receives the range estimation signal RE and then determines a height H of the person 106 from the difference of the sensed distance $D_{TOF}$ and a known height EH of the entranceway 102. The processing circuitry 108 thereafter utilizes the determined H of the person 106 to identify the person and to generate control signals CS to control peripheral components 110 of the user identification based control system 100 based upon the identified user, as will be explained in more detail below. In the embodiments of the user identification based control system 100 described in the present application, the TOF ranging sensor 104 is shown and described as being positioned in an entranceway 102 such as a doorway of a room, but the TOF ranging sensor may more generally be positioned anywhere that enables the TOF ranging sensor to sense a distance $D_{TOF}$ to a person that is a function of the height of the person, as will be described in more detail below.

In the present description, certain details are set forth in conjunction with the described embodiments to provide a sufficient understanding of the present disclosure. One skilled in the art will appreciate, however, that the other embodiments may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present disclosure.

Because the TOF ranging sensor 104 is positioned above or at the top of the entranceway 102, the distance $D_{TOF}$ from the range detection circuit to a person can be used to determine the height H of the person 106 if the height EH of the entranceway is known. This is true so long as the person 106 is standing on a base or floor corresponding to the bottom of the entranceway 102. The height of the person 106 is a function of the sensed distance $D_{TOF}$, namely the height H is equal to the height EH of the entranceway 102 minus the sensed distance ($H=EH-D_{TOF}$). In general, the TOF ranging sensor 104 is positioned a known height EH over a surface on which persons being sensed are present, and in this way the height of a person 106 corresponds to the sensed distance $D_{TOF}$ to the person subtracted from the known height EH. Although only a single person 106 is shown in FIG. 1, the TOF ranging sensor 104 can also detect the heights H of multiple people in the field of view FOV of the sensor in embodiments of the present disclosure. In addition to sensing the height H of a person or people in the entranceway 102, the range estimation signal RE generated by the TOF ranging sensor 104 may also be utilized by the processing circuitry 108 to detect a speed of a person 106 or persons passing through the entranceway 102 in embodiments of the present disclosure. The detected speed may then be utilized in identifying the person 106 or persons, as will be described in more detail below.

The user identification based control system 100 may also include additional user identification related devices that are used in combination with the sensed distances $D_{TOF}$ provided by the TOF ranging sensor 104 to identify users or persons. In the embodiment of FIG. 1, the user identification based control system 100 further includes additional user identification related devices in the form of an image capture device 112 and thermal sensors 114 coupled to the processing circuitry 108. The processing circuitry 108 activates these additional user identification related devices to assist the processing circuitry in identifying a person 106 or persons when the identification cannot be made with reasonable certainty based solely on the sensed distance $D_{TOF}$ and detected speed determined from the range estimation signal RE.

These additional user identification related devices may also be utilized by the processing circuitry 108 in combination with the range estimation signal RE to provide more sophisticated control of the peripheral components 110, as will be described in more detail below. The processing circuitry 108 may also utilize these other types of identification devices like the image capture device 112 and thermal sensors 114 to determine whether a sensed distance $D_{TOF}$ is in fact a user or person 106, or whether the sensed distance instead corresponds to an object such as a chair or a box that is brought through the entranceway 102. In this way, the processing circuitry 108 may distinguish between people and objects passing through the entranceway 102 and control the peripheral components 110 accordingly.

Prior to operation of the user identification based control system 100, the processing circuitry 108 must be programmed or configured to provide information to the system to enable identification of persons or users, and to associate or define particular control actions with the identified user or users. In the following examples, the user identification based control system 100 will be considered to be part of a smart home system by way of example. The control system 100 may, however, be included in other types of systems such as smart systems for commercial office buildings, business employee tracking and security related smart systems, and so on. Where the control system 100 is part of smart home system, the height EH of the entranceway 102 would typically be provided to the user identification based control system 100 along with heights of the family members where the control system is part of a smart home system to enable the processing circuitry 108 to identify family members. A configuration process could also be used where, as a name or profile for each family member is input to the control system 100, the family member stands in the entranceway 102 so the control system senses a distance $D_{TOF}$ for each member and in this way associates this sensed distance $D_{TOF}$ with each family member.

Other information like music preferences, lighting preferences, specific actions to be taken when a particular person enters a specific room, and so on may be programmed in the control system 100 to allow the processing circuitry 108 to implement more sophisticated control of the peripheral components 110. The precise manner in which configuration information is provided to the user identification based control system 100 may of course vary, along with the specific configuration information provided. As used in the present description, the terms "family member," "member," "person," and "user" are used interchangeably, with each term being used broadly in this context and including persons but also including animals as well, such as family pets like cats or dogs in smart home system applications. The term object is used to mean something other than a person that may be sensed by the TOF ranging sensor 104 passing through the entranceway 102.

After configuration of the user identification based control system 100, the processing circuitry 108 operates to identify the person 106 or persons passing through the entranceway 102 and thereafter controls the peripheral components 110 to perform a desired action or functions of the context aware smart system of which the user identification based control system is a part. The specific type and function of the peripheral components 110 will depend upon the type of context aware smart system in which the user identification based control system 100 is being utilized. Where the user identification based control system 100 is part of a smart home system, the peripheral components 114 may include lighting systems, heating systems, cooling systems, audio systems, home theater systems, home security systems, and so on.

The specific control of the peripheral components 114 by the processing circuitry 108 depends on the identification of the person 106 or persons detected through the range estimation signal RE from the TOF ranging sensor 104 and the configuration information provided to the user identification based control system 100. For example, in a smart home system the processing circuitry 108 may turn ON lights upon detecting a person 106 entering a room (not shown) associated with the entranceway 102. Furthermore, where the processing circuitry 108 processes the range estimation signal RE and senses two persons entering the room, and these two people are determined to be a husband and wife of a family living in a house under control of the smart home system including the user identification based control system 100, the processing circuitry can take specific actions based on the identification of the husband and wife. For example, the processing circuitry 108 could turn ON a particular type of music enjoyed by the husband and wife, could adjust the lighting of the room, and could activate a heating or cooling system for the associated room since people are now present in the room.

Where the processing circuitry 108 identifies the person 106 or persons entering the room as a child or children, the processing circuitry 108 may in addition to turning ON the lights, turn ON a television in the room associated with the entranceway 102, or start playing a different type of music enjoyed by the children. In this way, a smart home system including the user identification based control system 100 may automatically provide users (i.e., family members in the present smart home example) with customized experiences with the system. Conversely, the processing circuitry 108 may deactivate or adjust control of the peripheral components 110 based on an identified person or persons leaving a room associated with the entranceway 102 as detected by the TOF ranging sensor 104. This type of control may realize energy savings by only activating lighting, heating and cooling units when a room is occupied and turning OFF such systems otherwise, and may customize a room environment to suit the identified person or persons entering the room. Thus, the user identification based control system 100 controls the peripheral components 110 based on context, namely the identified person 106 or persons, the particular room of the house that is associated with the entranceway 102, and so on.

Figure 2:
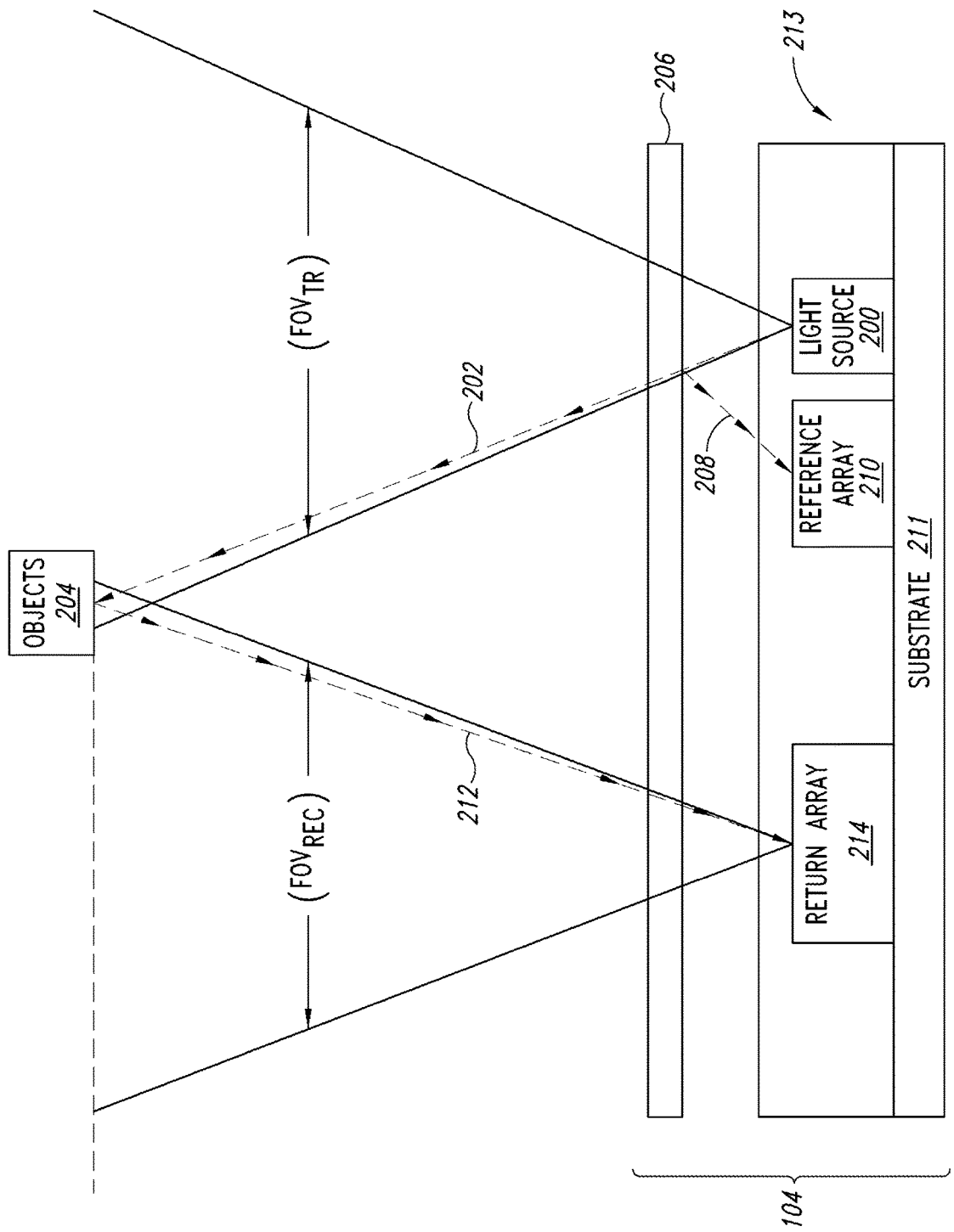
FIG. 2 is a functional diagram illustrating the operation of the TOF ranging sensor of FIG. 1.

Before describing additional embodiments of the user identification based control system 100 of FIG. 1, the structure and operation of embodiments of the TOF ranging sensor 104 will first be described with reference to FIGS. 2-7. FIG. 2 is a functional diagram illustrating components and operation of the TOF ranging sensor 104 of FIG. 1. The TOF ranging sensor 104 may be a single chip that includes a light source 200 and return and reference arrays of photodiodes 214, 210. Alternatively, these components may be incorporated within the circuitry of the image capture device 100 or other circuitry or chip within an electronic device including the image capture device. The light source 200 and the return and reference arrays 214, 210 are formed on a substrate 211. In one embodiment, all the components of the TOF ranging sensor 104 are contained within the same chip or package 213, with all components except for the light source 200 being formed in the same integrated circuit within this package in one embodiment.

The light source 200 transmits optical pulse signals having a transmission field of view $FOV_{TR}$ to irradiate objects within the field of view. A transmitted optical pulse signal 202 is illustrated in FIG. 2 as a dashed line and irradiates an object 204 within the transmission field of view $FOV_{TR}$ of the light source 200. In addition, a reflected portion 208 of the transmitted optical pulse signal 202 reflects off an integrated panel, which may be within a package 213 or may be on a cover 206 of the image capture device 100. The reflected portion 208 of the transmitted pulse is illustrated as reflecting off the cover 206, however, it may be reflected internally within the package 213.

The cover 206 may be glass, such as on a front of a mobile device associated with a touch panel or the cover may be metal or another material that forms a back cover of the electronic device. The cover will include openings to allow the transmitted and return signals to be transmitted and received through the cover if not a transparent material.

The reference array 210 of light sensors detects this reflected portion 208 to thereby sense transmission of the optical pulse signal 208. A portion of the transmitted optical pulse signal 202 reflects off objects 204 within the transmission field of view $FOV_{TR}$ as return optical pulse signals 212 that propagate back to the TOF ranging sensor 104. The TOF ranging sensor 104 includes a return array 214 of light sensors having a receiving field of view $FOV_{REC}$ that detects the return optical pulse signals 212. The field of view FOV of FIG. 1 includes the transmitting and receiving fields of view $FOV_{TR}$ and $FOV_{REC}$. The TOF ranging sensor 104 then determines respective distances $D_{TOF}$ between the TOF ranging sensor and the objects 204 based upon the time between the reference array 210 sensing transmission of the optical pulse signal 202 and the return array 214 sensing the return optical pulse signal 212. The TOF ranging sensor 104 also generates a signal amplitude SA for each of the detected objects 204, as will be described in more detail with reference to FIG. 3.

Figure 3:
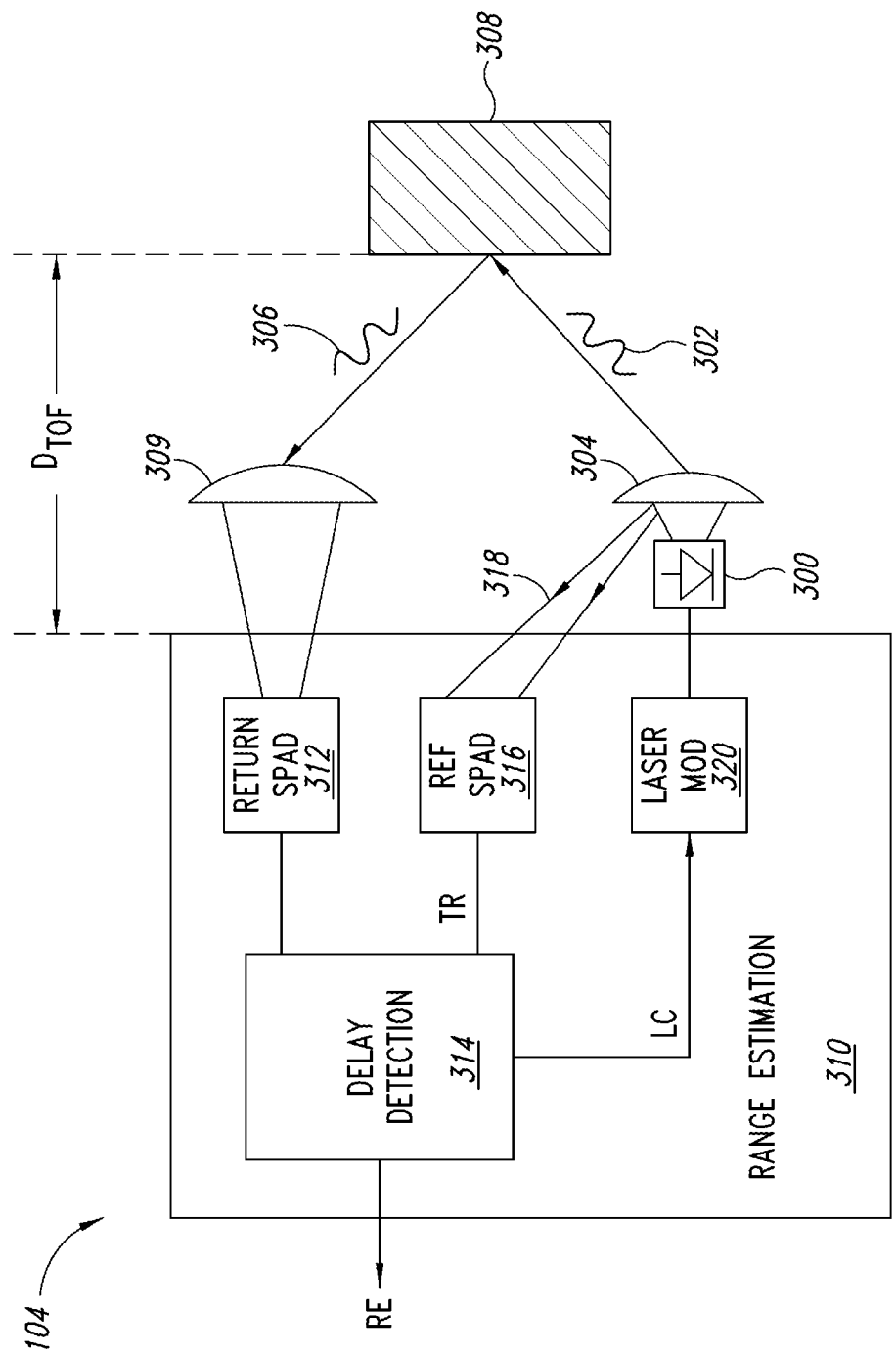
FIG. 3 is a functional block diagram illustrating in more detail one embodiment of the TOF ranging sensor of FIGS. 1 and 2.

FIG. 3 is a more detailed functional block diagram of the TOF ranging sensor 104 of FIGS. 1 and 2 according to one embodiment of the present disclosure. In the embodiment of FIG. 3, the TOF ranging sensor 104 includes a light source 300, which is, for example, a laser diode such as a vertical-cavity surface-emitting laser (VCSEL) for generating the transmitted optical pulse signal designated as 302 in FIG. 3. The transmitted optical pulse signal 302 is transmitted in the transmission field of view $FOV_{TR}$ of the light source 300 as discussed above with reference to FIG. 2. In the embodiment of FIG. 3, the transmitted optical pulse signal 302 is transmitted through a projection lens 304 to focus the transmitted optical pulse signals 302 so as to provide the desired field of view $FOV_{TR}$. The projection lens 304 can be used to control the transmitted field of view $FOV_{TR}$ of the sensor 104 and is an optional component, with some embodiments of the sensor not including the projection lens.

The reflected or return optical pulse signal is designated as 306 in FIG. 3 and corresponds to a portion of the transmitted optical pulse signal 302 that is reflected off objects within the field of view $FOV_{TR}$. One such object 308 is shown in FIG. 3. The return optical pulse signal 306 propagates back to the TOF ranging sensor 104 and is received through a return lens 309 that provides the desired return or receiving field of view $FOV_{REC}$ for the sensor 104, as described above with reference to FIG. 2. The return lens 309 in this way is used to control the field of view $FOV_{REC}$ of the sensor 104. The return lens 309 directs the return optical pulse signal 306 to range estimation circuitry 310 for generating the imaging distance $D_{TOF}$ and signal amplitude SA for each object 308. The return lens 309 is an optional component and thus some embodiments of the TOF ranging sensor 104 do not include the return lens.

In the embodiment of FIG. 3, the range estimation circuitry 310 includes a return single-photon avalanche diode (SPAD) array 312, which receives the returned optical pulse signal 306 via the lens 309. The SPAD array 312 corresponds to the return array 214 of FIG. 2 and typically includes a large number of SPAD cells (not shown), each cell including a SPAD for sensing a photon of the return optical pulse signal 306. In some embodiments of the TOF ranging sensor 104, the lens 309 directs reflected optical pulse signals 306 from separate spatial zones within the field of view $FOV_{REC}$ of the sensor to certain groups of SPAD cells or zones of SPAD cells in the return SPAD array 312, as will be described in more detail below.

Each SPAD cell in the return SPAD array 312 provides an output pulse or SPAD event when a photon in the form of the return optical pulse signal 306 is detected by that cell in the return SPAD array. A delay detection and processing circuit 314 in the range estimation circuitry 310 determines a delay time between transmission of the transmitted optical pulse signal 302 as sensed by a reference SPAD array 316 and a SPAD event detected by the return SPAD array 312. The reference SPAD array 316 is discussed in more detail below. The SPAD event detected by the return SPAD array 312 corresponds to receipt of the return optical pulse signal 306 at the return SPAD array. In this way, by detecting these SPAD events, the delay detection and processing circuit 314 estimates an arrival time of the return optical pulse signal 306. The delay detection and processing circuit 314 then determines the time of flight TOF based upon the difference between the transmission time of the transmitted optical pulse signal 302 as sensed by the reference SPAD array 316 and the arrival time of the return optical pulse signal 306 as sensed by the SPAD array 312. From the determined time of flight TOF, the delay detection and processing circuit 314 generates the range estimation signal RE (FIG. 1) indicating the detected distance $D_{TOF}$ between the hand 308 and the TOF ranging sensor 104.

The reference SPAD array 316 senses the transmission of the transmitted optical pulse signal 302 generated by the light source 300 and generates a transmission signal TR indicating detection of transmission of the transmitted optical pulse signal. The reference SPAD array 316 receives an internal reflection 318 from the lens 304 of a portion of the transmitted optical pulse signal 302 upon transmission of the transmitted optical pulse signal from the light source 300, as discussed for the reference array 210 of FIG. 2. The lenses 304 and 309 in the embodiment of FIG. 3 may be considered to be part of the glass cover 206 or may be internal to the package 213 of FIG. 2. The reference SPAD array 316 effectively receives the internal reflection 318 of the transmitted optical pulse signal 302 at the same time the transmitted optical pulse signal is transmitted. In response to this received internal reflection 318, the reference SPAD array 316 generates a corresponding SPAD event and in response thereto generates the transmission signal TR indicating transmission of the transmitted optical pulse signal 302.

The delay detection and processing circuit 314 includes suitable circuitry, such as time-to-digital converters or time-to-analog converters, to determine the time-of-flight TOF between the transmission of the transmitted optical pulse signal 302 and receipt of the reflected or return optical pulse signal 308. The delay detection and processing circuit 314 then utilizes this determined time-of-flight TOF to determine the distance $D_{TOF}$ between the hand 308 and the TOF ranging sensor 104. The range estimation circuitry 310 further includes a laser modulation circuit 320 that drives the light source 300. The delay detection and processing circuit 314 generates a laser control signal LC that is applied to the laser modulation circuit 320 to control activation of the laser 300 and thereby control transmission of the transmitted optical pulse signal 302. The range estimation circuitry 310 also determines the signal amplitude SA based upon the SPAD events detected by the return SPAD array 312. The signal amplitude SA is based on the number of photons of the return optical pulse signal 306 received by the return SPAD array 312. The closer the object 308 is to the TOF ranging sensor 104 the greater the sensed signal amplitude SA, and, conversely, the farther away the object the smaller the sensed signal amplitude.

Figure 4A:
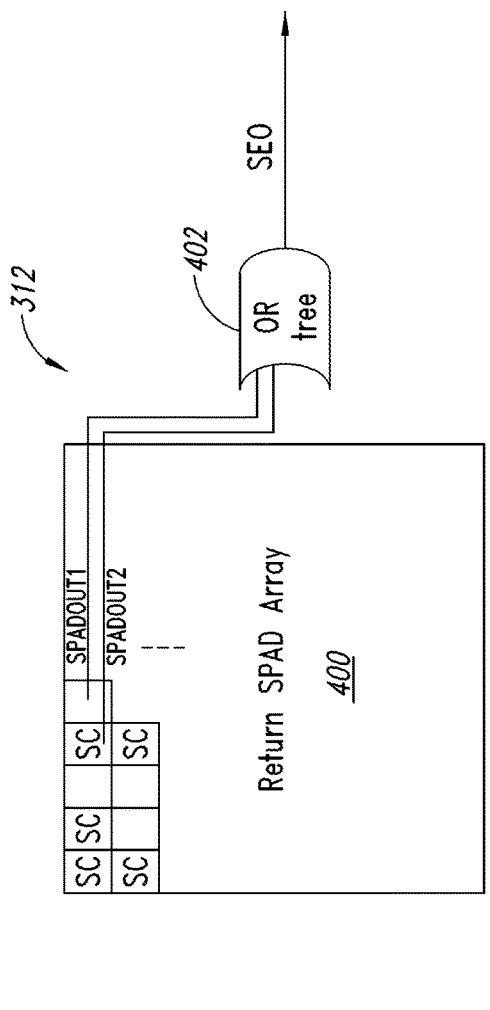
FIG. 4A is a functional diagram of a single zone embodiment of the return single photon avalanche diode (SPAD) array contained in the TOF ranging sensor of FIG. 3.

FIG. 4A is a functional diagram of a single zone embodiment of the return SPAD array 312 of FIG. 3. In this embodiment, the return SPAD array 312 includes a SPAD array 400 including a plurality of SPAD cells SC, some of which are illustrated and labeled in the upper left portion of the SPAD array. Each of these SPAD cells SC has an output, with two outputs labeled SPADOUT1, SPADOUT2 shown for two SPAD cells by way of example in the figure. The output of each SPAD cell SC is coupled to a corresponding input of an OR tree circuit 402. In operation, when any of the SPAD cells SC receives a photon from the reflected optical pulse signal 306, the SPAD cell provides an active pulse on its output. Thus, for example, if the SPAD cell SC having the output designated SPADOUT2 in the figure receives a photon from the reflected optical pulse signal 306, then that SPAD cell will pulse the output SPADOUT2 active. In response to the active pulse on the SPADOUT2, the OR tree circuit 402 will provide an active SPAD event output signal SEO on its output. Thus, whenever any of the SPAD cells SC in the return SPAD array 400 detects a photon, the OR tree circuit 402 provides an active SEO signal on its output. In the single zone embodiment of FIG. 4A, the TOF ranging sensor 104 may not include the lens 309 and the return SPAD array 312 corresponds to the return SPAD array 400 and detects photons from reflected optical pulse signals 306 within the single field of view $FOV_{REC}$ (FIG. 2) of the sensor.

Figure 4B:
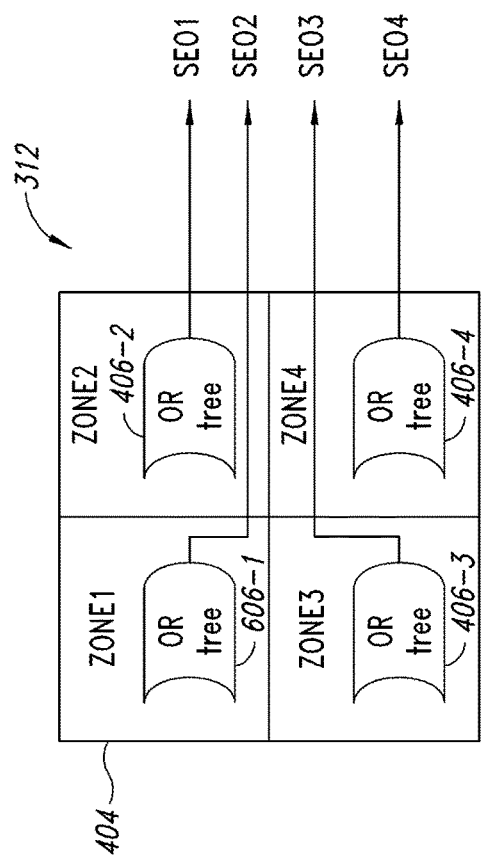
FIG. 4B is a functional diagram of a multi zone embodiment of the return SPAD array contained in the TOF ranging sensor of FIG. 3.

FIG. 4B is a functional diagram of a multiple zone embodiment of the return SPAD array 312 FIG. 3. In this embodiment, the return SPAD array 312 includes a return SPAD array 404 having four array zones ZONE1-ZONE4, each array zone including a plurality of SPAD cells. Four zones ZONE1-ZONE4 are shown by way of example and the SPAD array 404 may include more or fewer zones. A zone in the SPAD array 404 is a group or portion of the SPAD cells SC contained in the entire SPAD array. The SPAD cells SC in each zone ZONE1-ZONE4 have their output coupled to a corresponding OR tree circuit 406-1 to 406-4. The SPAD cells SC and outputs of these cells coupled to the corresponding OR tree circuit 406-1 to 406-4 are not shown in FIG. 4B to simplify the figure.

In this embodiment, each of zones ZONE1-ZONE4 of the return SPAD array 404 effectively has a smaller subfield of view corresponding to a portion of the overall field of view FOV$_{REC}$ (FIG. 2). The return lens 309 of FIG. 3 directs return optical pulse signals 306 from the corresponding spatial zones or subfields of view within the overall field of view FOV$_{REC}$ to corresponding zones ZONE1-ZONE4 of the return SPAD array 404. In operation, when any of the SPAD cells SC in a given zone ZONE1-ZONE4 receives a photon from the reflected optical pulse signal 306, the SPAD cell provides an active pulse on its output that is supplied to the corresponding OR tree circuit 406-1 to 406-4. Thus, for example, when one of the SPAD cells SC in the zone ZONE1 detects a photon that SPAD cell provides and active pulse on its output and the OR tree circuit 406-1, in turn, provides an active SPAD event output signal SEO1 on its output. In this way, each of the zones ZONE1-ZONE4 operates independently to detect SPAD events (i.e., receive photons from reflected optical pulse signals 306 in FIG. 3).

Figure 5A:
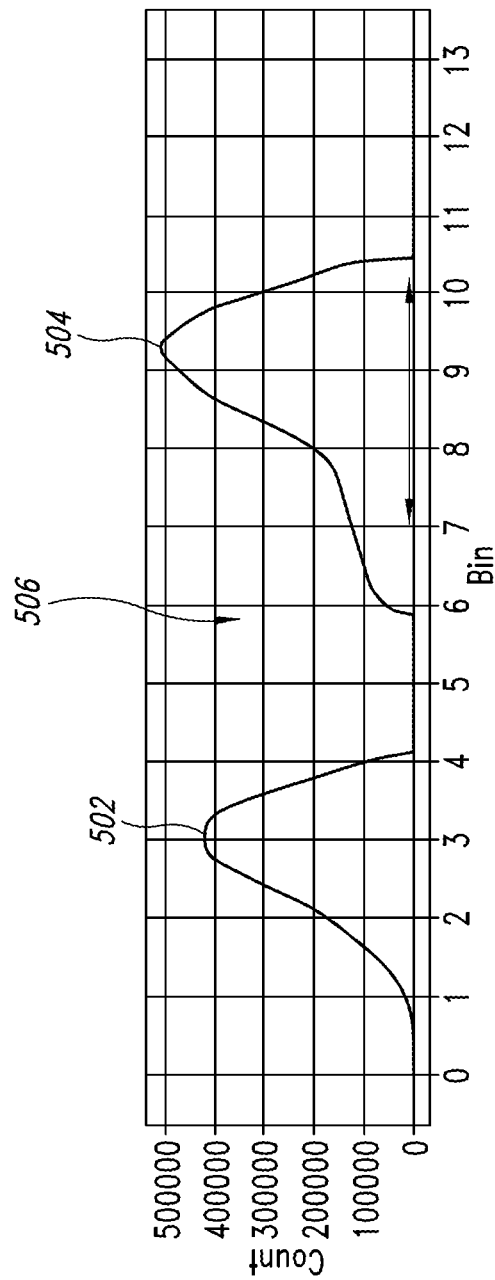
FIGS. 5A and 5B are graphs illustrating operation of the TOF ranging sensor of FIG. 3 in detecting multiple objects within a field of view of the sensor.
Figure 5B:
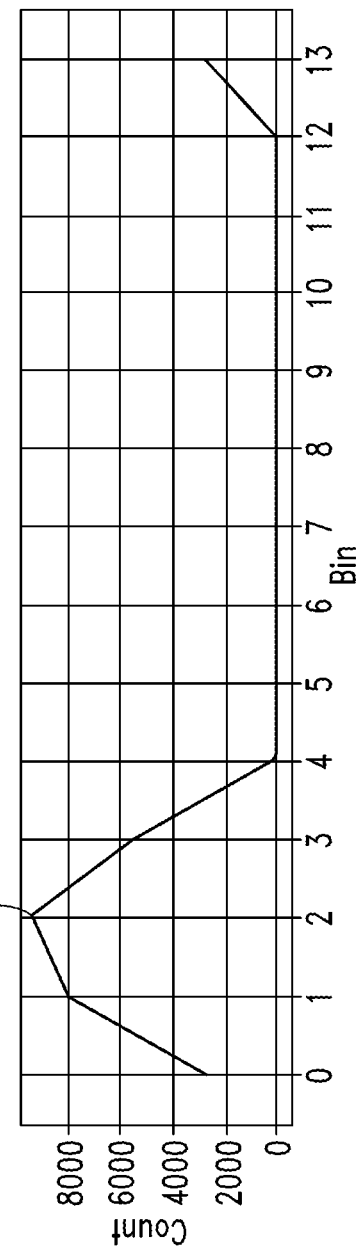

FIGS. 5A and 5B are graphs illustrating operation of the TOF ranging sensor 104 of FIG. 2 in detecting multiple objects within the field of view FOV of the TOF ranging sensor 104 of FIGS. 2 and 3. The graphs of FIGS. 5A and 5B are signal diagrams showing a number of counts along a vertical axis and time bins along a horizontal axis. The number of counts indicates a number of SPAD events that have been detected in each bin, as will be described in more detail below. These figures illustrate operation of a histogram based ranging technique implemented by the TOF ranging sensor 104 of FIGS. 1-3 according to an embodiment of the present disclosure. This histogram based ranging technique allows the TOF ranging sensor 104 to sense or detect multiple objects within the field of view FOV of the TOF ranging sensor.

Figure 6:
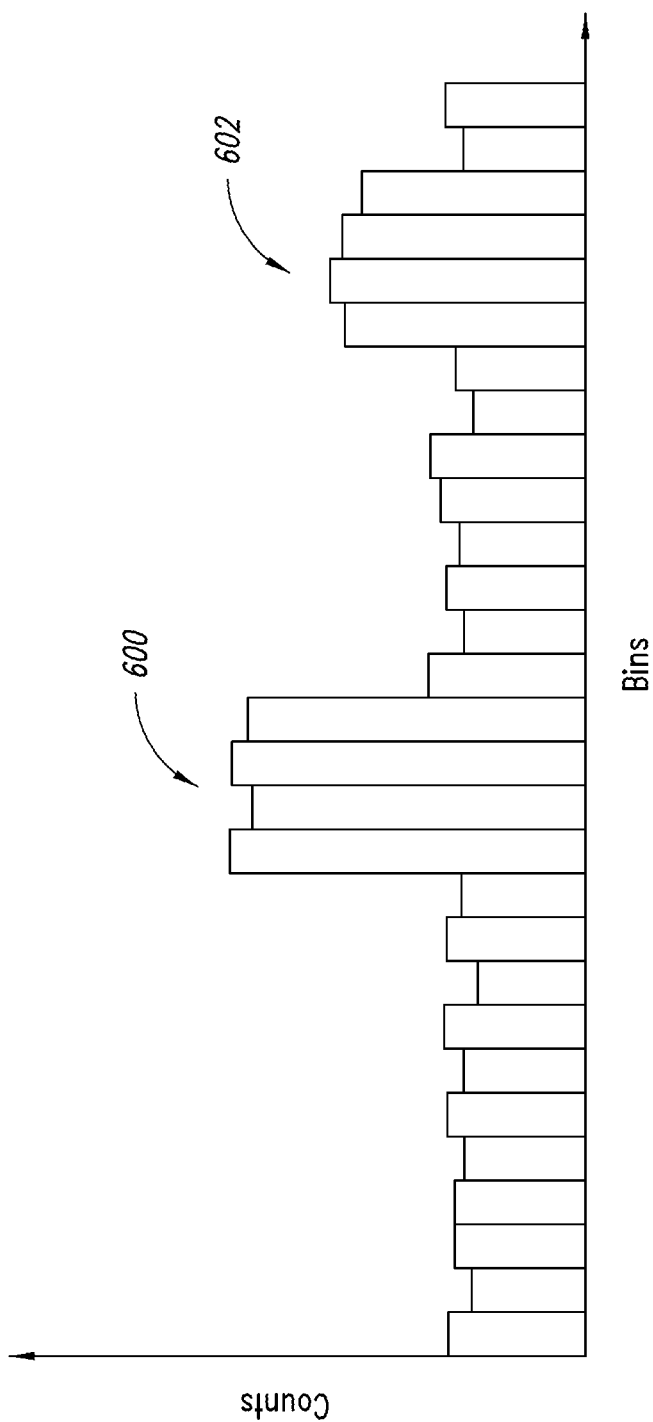
FIG. 6 is a histogram generated by the TOF ranging sensor in the embodiment of FIGS. 5A and 5B which provides detected distance information for multiple objects within the field of view of the sensor.

This histogram based ranging technique is now described in more detail with reference to FIGS. 3, 4A, 4B, 5A and 5B. In this technique, more than one SPAD event is detected each cycle of operation, where the transmitted optical pulse signal 302 is transmitted each cycle. SPAD events are detected by the return SPAD array 312 (i.e., return SPAD array 400 or 404 of FIGS. 4A, 4B) and reference SPAD array 316, where a SPAD event is an output pulse provided by the return SPAD array indicating detection of a photon. Thus, an output pulse from the OR tree circuit 402 of FIG. 4A or one of the OR tree circuits 406-1 to 406-4 of FIG. 4B. Each cell in the SPAD arrays 312 and 3216 will provide an output pulse or SPAD event when a photon is received in the form of the return optical pulse signal 306 for target SPAD array 212 and internal reflection 318 of the transmitted optical pulse signal 302 for the reference SPAD array 316. By monitoring these SPAD events an arrival time of the optical signal 306, 318 that generated the pulse can be determined. Each detected SPAD event during each cycle is allocated to a particular bin, where a bin is a time period in which the SPAD event was detected. Thus, each cycle is divided into a plurality of bins and a SPAD event detected or not for each bin during each cycle. Detected SPAD events are summed for each bin over multiple cycles to thereby form a histogram in time as shown in FIG. 6 for the received or detected SPAD events. The delay detection and processing circuit 314 of FIG. 3 or other control circuitry in the TOF ranging sensor 104 implements this histogram-based technique in one embodiment of the sensor.

FIGS. 5A and 5B illustrate this concept over a cycle. Multiple cells in each of the SPAD arrays 312 and 316 may detect SPAD events in each bin, with the count of each bin indicating the number of such SPAD events detected in each bin over a cycle. FIG. 5B illustrates this concept for the internal reflection 318 of the transmitted optical pulse signal 302 as detected by the reference SPAD array 316. The sensed counts (i.e., detected number of SPAD events) for each of the bins shows a peak 500 at about bin 2 with this peak being indicative of the transmitted optical pulse signal 302 being transmitted. FIG. 5A illustrates this concept for the reflected or return optical pulse signal 306, with there being two peaks 502 and 504 at approximately bins 3 and 9. These two peaks 502 and 504 (i.e., detected number of SPAD events) indicate the occurrence of a relatively large number of SPAD events in the bins 3 and 9, which indicates reflected optical pulse signals 306 reflecting off a first object causing the peak at bin 3 and reflected optical pulse signals reflecting off a second object at a greater distance than the first object causing the peak at bin 9. A valley 506 formed by a lower number of counts between the two peaks 502 and 504 indicates no additional detected objects between the first and second objects. Thus, the TOF ranging sensor 104 is detecting two objects, such as the objects 103 and 105 of FIG. 1, within the FOV of the sensor in the example of FIGS. 7A and 7B. The two peaks 502 and 504 in FIG. 5A are shifted to the right relative to the peak 500 of FIG. 5B due to the time-of-flight of the transmitted optical pulse signal 302 in propagating from the TOF ranging sensor 104 to the two objects 103, 105 within the FOV but at different distances from the TOF ranging sensor.

FIG. 6 illustrates a histogram generated by TOF ranging sensor 104 over multiple cycles. The height of the rectangles for each of the bins along the horizontal axis represents the count indicating the number of SPAD events that have been detected for that particular bin over multiple cycles of the TOF ranging sensor 104. As seen in the histogram of FIG. 6, two peaks 600 and 602 are again present, corresponding to the two peaks 602 and 604 in the single cycle illustrated in FIG. 5A. From the histogram of FIG. 6, either the TOF ranging sensor 104 determines a distance D$_{TOF}$ to each of the first and second objects 103, 105 in the FOV of the TOF ranging sensor. In addition, the TOF ranging sensor 104 also generates the signal amplitude SA for each of the objects 103, 105 based upon these counts, namely the number of photons or SPAD events generated by the return SPAD array 312 in response to the return optical pulse signal 306.

Figure 7:
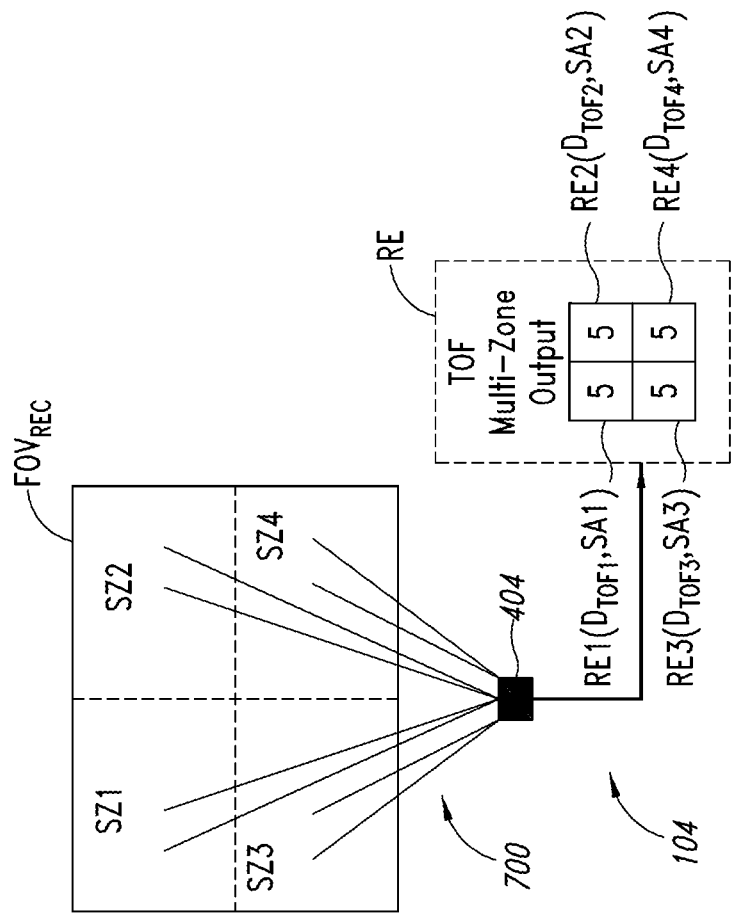
FIG. 7 is a diagram illustrating multiple spatial zones where the TOF ranging sensor of FIG. 3 is a multiple zone sensor.

FIG. 7 is a diagram illustrating multiple spatial zones within the receiving field of view FOV$_{REC}$ where the TOF ranging sensor 104 is a multiple zone sensor including the return SPAD array 404 of FIG. 4B. In this embodiment, the receiving field of view FOV$_{REC}$ includes four spatial zones SZ1-SZ4 as shown. Thus, the four spatial zones SZ1-SZ4 collectively form the receiving field of view FOV$_{REC}$ of the TOF ranging sensor 104. The transmitted optical pulse signal 302 (FIG. 3) illuminates these four spatial zones SZ1-SZ4 within the receiving field of view FOV$_{REC}$. The number of spatial zones SZ corresponds to the number of array zones ZONE1-ZONE4 in the return SPAD array 404 of FIG. 4B. Where the return SPAD array 404 includes a different number of array zones ZONE1-ZONE4 or a different arrangement of the array zones within the return SPAD array, then the number and arrangement of the corresponding spatial zones SZ within the overall field of view FOV$_{REC}$ will likewise vary. In such a multiple zone TOF ranging sensor 104 as functionally illustrated in FIG. 7, the return lens 309 (FIG. 3) is configured to route return optical pulse signals 306 from each of the spatial zones SZ within the overall field of view FOV$_{REC}$ to a corresponding array zone ZONE1-ZONE4 of the return SPAD array 404 of FIG. 4B. This is represented in the figure through the pairs of lines 700 shown extending from the return SPAD array 404 to each of the spatial zones SZ1-SZ4.

Each of the array zones ZONE1-ZONE4 outputs respective SPAD event output signals SEO1-SEO4 as previously described with reference to FIG. 4B, and the TOF ranging sensor 104 accordingly calculates four different imaging distances $D_{TOF1}$-$D_{TOF4}$, one for each of the spatial zones SZ1-SZ4. Thus, in this embodiment the range estimation signal RE generated by the TOF ranging sensor 104 includes four different values for the four different detected imaging distances $D_{TOF1}$-$D_{TOF4}$. Each of these detected imaging distances $D_{TOF1}$-$D_{TOF4}$ is shown as being part of the generated range estimation signal RE to have a value 5. This would indicate objects in each of the spatial zones SZ1-SZ4 are the same distance away, or indicate that there is one object covering all the spatial zones. The value 5 was arbitrarily selected merely to represent the value of each of the detected imaging distances $D_{TOF1}$-$D_{TOF4}$ and to illustrate that in the example of FIG. 7 each of these detected imaging distances has the same value. As seen in FIG. 7, the TOF ranging sensor 104 also outputs the signal amplitude SA signal for each of the spatial zones SZ and corresponding array zones ZONE. Thus, for the spatial zone SZ1 the TOF ranging sensor 104 generates the range estimation signal RE1 including the sensed distance $D_{TOF1}$ and signal amplitude SA1 generated based on SPAD events detected by array zone ZONE1. The signals RE2-RE4 for spatial zones SZ2-SZ4 and array zones ZONE2-ZONE4 are also shown. The signal amplitude SA generated by the TOF ranging sensor 104 in the embodiments of FIGS. 4A and 4B of the return SPAD array 400, 404 contained in the sensor may also be utilized by the processing circuitry 108 in controlling the operation of the user identification base control system 100, as will be described in more detail below.

Figure 8A:
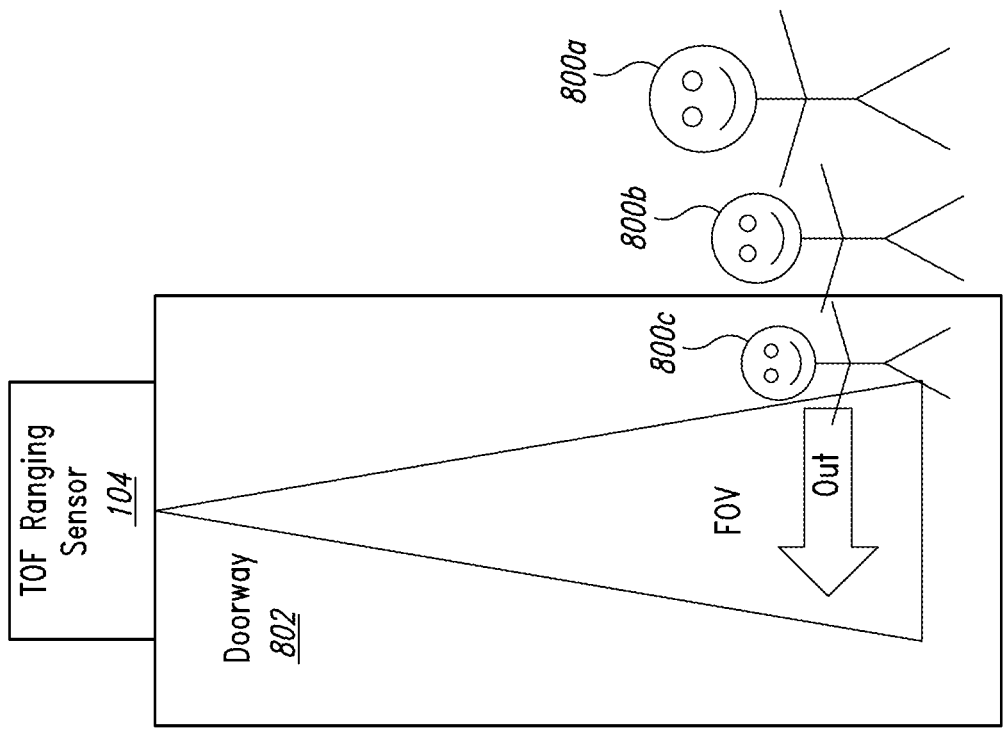
FIGS. 8A and 8B are diagrams illustrating operation of the TOF ranging sensor of FIGS. 1-7 in detecting the identity, presence and number of people entering and exiting an entranceway.
Figure 8B:
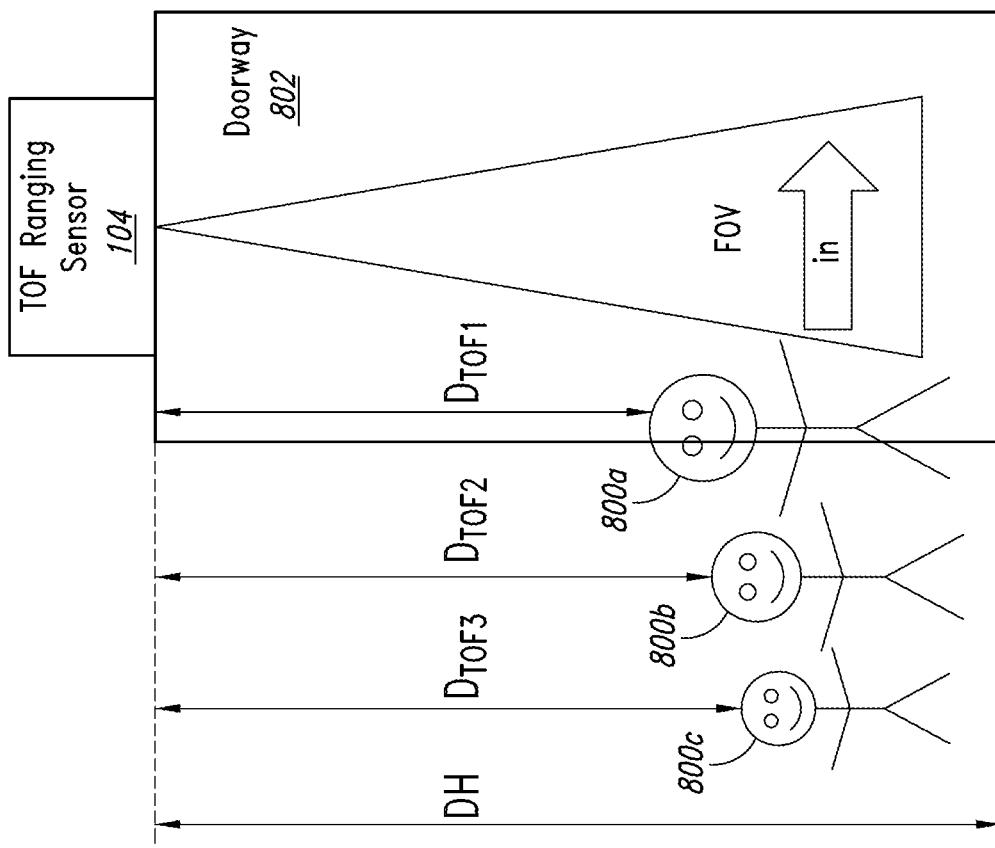

FIGS. 8A and 8B are diagrams illustrating operation of the TOF ranging sensor 104 of FIGS. 1-7 in detecting the identify, speed, and number of people 800a-c entering and exiting a doorway 802 according to one embodiment of the present disclosure. In the example embodiment of FIGS. 8A and 8B, the TOF ranging sensor 104 is a single zone sensor as discussed with reference to FIG. 4A. In FIG. 8A, the TOF ranging sensor 104 senses the distances $D_{TOF1}$-$D_{TOF3}$ to the people 800a-c as these people enter a room (not shown) associated with the door 802. From these sensed distances $D_{TOF1}$-$D_{TOF3}$, the processing circuitry 108 of FIG. 1 identifies the people 800a-c as these people enter the room. The processing circuitry 108 then controls the peripheral components 110 associated with the room based upon the identities of the people 800a-c.

In addition to the identities of the people 800, the processing circuitry 108 may also control the peripheral components 110 based upon a total number of people 800 entering the room, which is three in the example of FIG. 8A. As discussed above in relation to FIGS. 5 and 6, even where the TOF ranging sensor 104 is a single zone sensor multiple objects within the field of view FOV may be sensed. In this way, even if multiple people 800 are within the field of view FOV at the same time the TOF ranging sensor 104 can sense the distances $D_{TOF}$ to each of these multiple people for both counting and identification purposes. Where the room associated with the doorway 802 is a conference room in a business office, for example, the processing circuitry 108 could control the air conditioning of the conference room to provide additional cooling as more people enter the room in order to maintain a desired temperature.

The processing circuitry 108 could also estimate a speed of a person 800 through the doorway 802 and utilizes speed in identifying the person. The processing circuitry 108 could estimate the speed, for example, based upon the time or duration for which the person 800 and thus the corresponding sensed distance $D_{TOF}$ is present within the field of view FOV of the TOF ranging sensor 104. In addition, the processing circuitry 108 could utilize the estimated speed in identifying the person 800. A young child may be considered more likely to run or move very quickly through the doorway 802 and the processing circuitry 108 may thus identify the person 800 as a young child where the estimated speed is relatively high and the sensed distance $D_{TOF}$ is close to that of a known young child that has been configured in the user identification base control system 100. Alternatively, where the sensed distance $D_{TOF}$ is not close to that of any user configured in the control system 100, the processing circuitry 108 may nonetheless assume sensed person is a young child based upon the estimated speed. The processing circuitry 108 may also make other determinations based on the estimated speed and sensed distance $D_{TOF}$. If the estimated speed is greater than a threshold and the sensed distance $D_{TOF}$ is relatively large, the processing circuitry 108 may assume that the sensed object is not a person but a pet that has entered the doorway 802.

FIG. 8B illustrates the TOF ranging sensor 104 sensing the people 800 leaving the room associated with the doorway 802. The processing circuitry 108 then controls the peripheral components 110 of the room associated with the doorway 802 in a manner analogous to that described above for people entering the room. For example, the processing control circuitry 108 could turn OFF lighting, entertainment, and heating and cooling systems associated with the room in response to detecting that all people 800 have left the room. In the single zone embodiment of FIGS. 8A and 8B, the processing circuitry 108 in one embodiment determines that a person 800 has left the room by keeping track of who has entered the room and then, upon again sensing that person in the doorway 802, determining that person has left the room. Where the TOF ranging sensor 104 is a multiple zone sensor as will be described below with reference to FIGS. 9 and 10, the sensing of persons in the multiple zones may be utilized to determine whether a person 800 is leaving or entering a room.

In one embodiment, the TOF ranging sensor 104 also generates a signal amplitude SA for each sensed person 800 or object within the field of view FOV of the sensor. The processing circuitry 108 can also utilize the sensed signal amplitudes SA in controlling the operation of the user identification base control system 100. For example, where a sensed object has a relatively large signal amplitude SA for the sensed distance $D_{TOF}$ to the object, the processing circuitry 108 may determine that the sensed object is not a person but instead is some high reflectance object. In sum, the processing circuitry 108 may also utilize the sensed signal amplitude SA provided by the TOF ranging sensor 104 for each sensed object in identifying the object as a person or nonperson.

Figure 9:
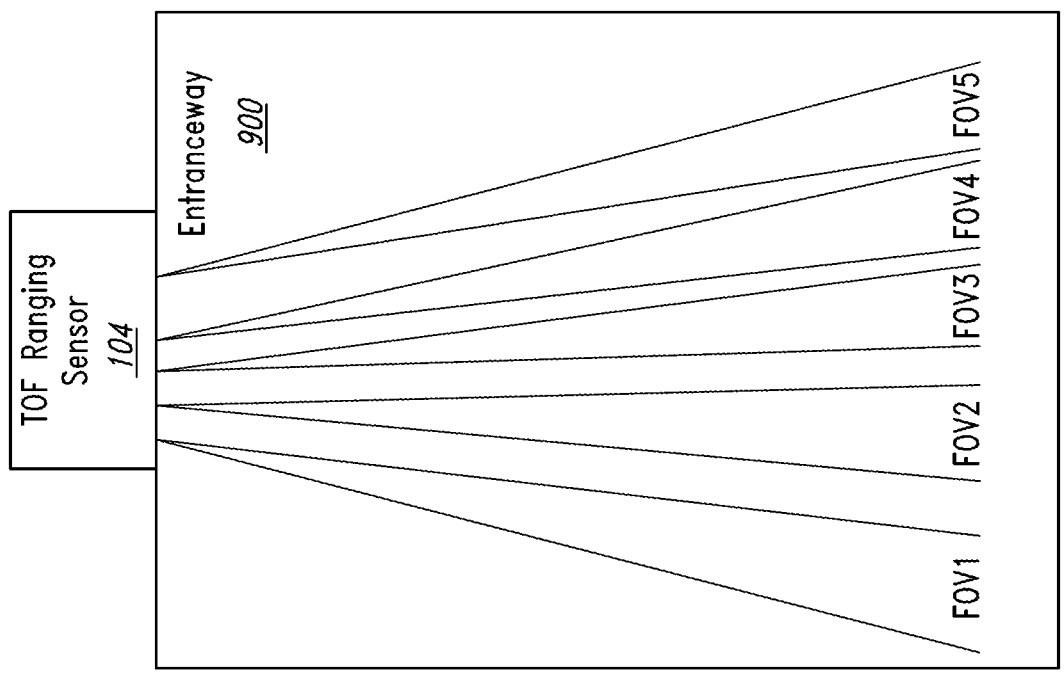
FIG. 9 is a diagram illustrating operation of the multiple zone TOF ranging sensor of FIGS. 4B and 7 positioned in an entranceway according to one embodiment of the present disclosure.

FIG. 9 is a diagram illustrating operation of the multiple zone TOF ranging sensor of FIGS. 4B and 7 positioned in an entranceway 900 according to another embodiment of the present disclosure. In the example of FIG. 9, the TOF ranging sensor 104 includes five fields of view FOV1-FOV5 that correspond to the multiple zones detectable by a single TOF sensor. In alternative embodiments, a plurality of TOF sensors can be positioned in a package in the door way to provide multiple, comparable outputs to identify a user and the speed with which the user is moving through the doorway or environment.

This embodiment in FIG. 9 provides improved granularity of the range estimation signal RE generated by the TOF ranging sensor 104. The inclusion of multiple spatial zones or fields of view FOV as discussed with reference to FIG. 7 and the corresponding multiple array zones as discussed with reference to FIG. 4B allow for different types processing by the processing circuitry 108 to identify persons or objects passing through the entranceway 900. For example, in the multiple zone embodiment of FIG. 9 the processing circuitry 108 can determine whether a person is entering or exiting the room associated with the entranceway 900 based upon how the sensed distance $D_{TOF}$ for the person or object propagates through the multiple fields of view FOV1-FOV5. The speed of the person or object may also be estimated based on such propagation through the multiple fields of view FOV1-FOV5.

Figure 10B:
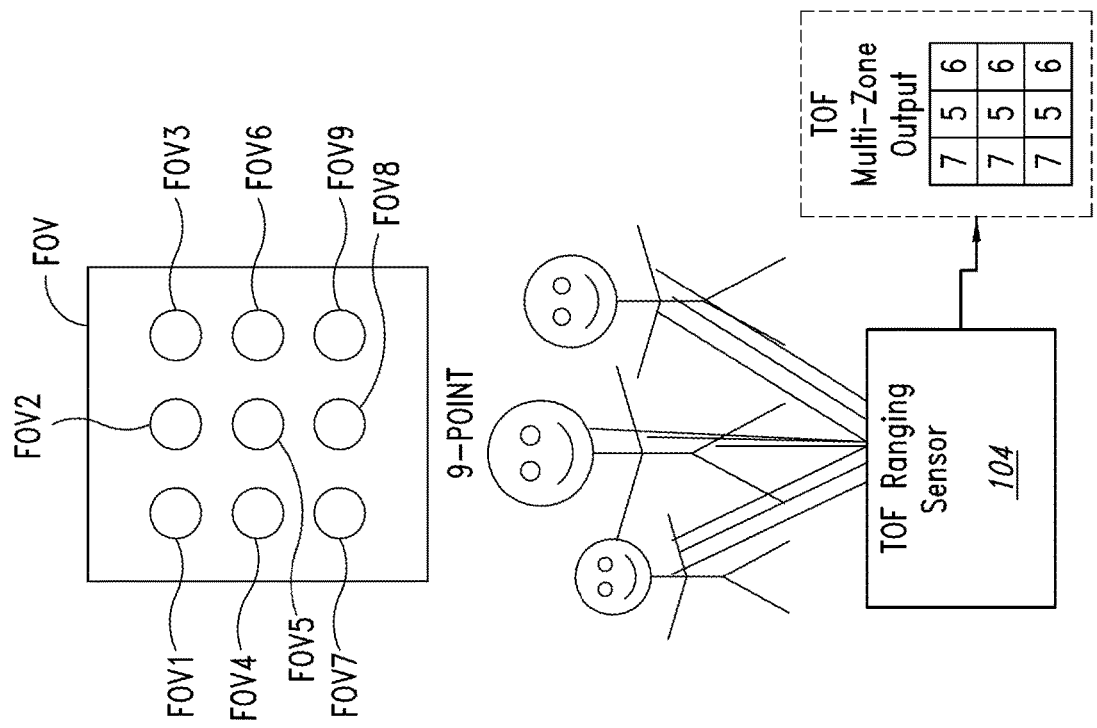
FIGS. 10A and 10B are diagrams illustrating two additional multiple zone embodiments of the TOF ranging sensor of FIG. 9.
Figure 10A:
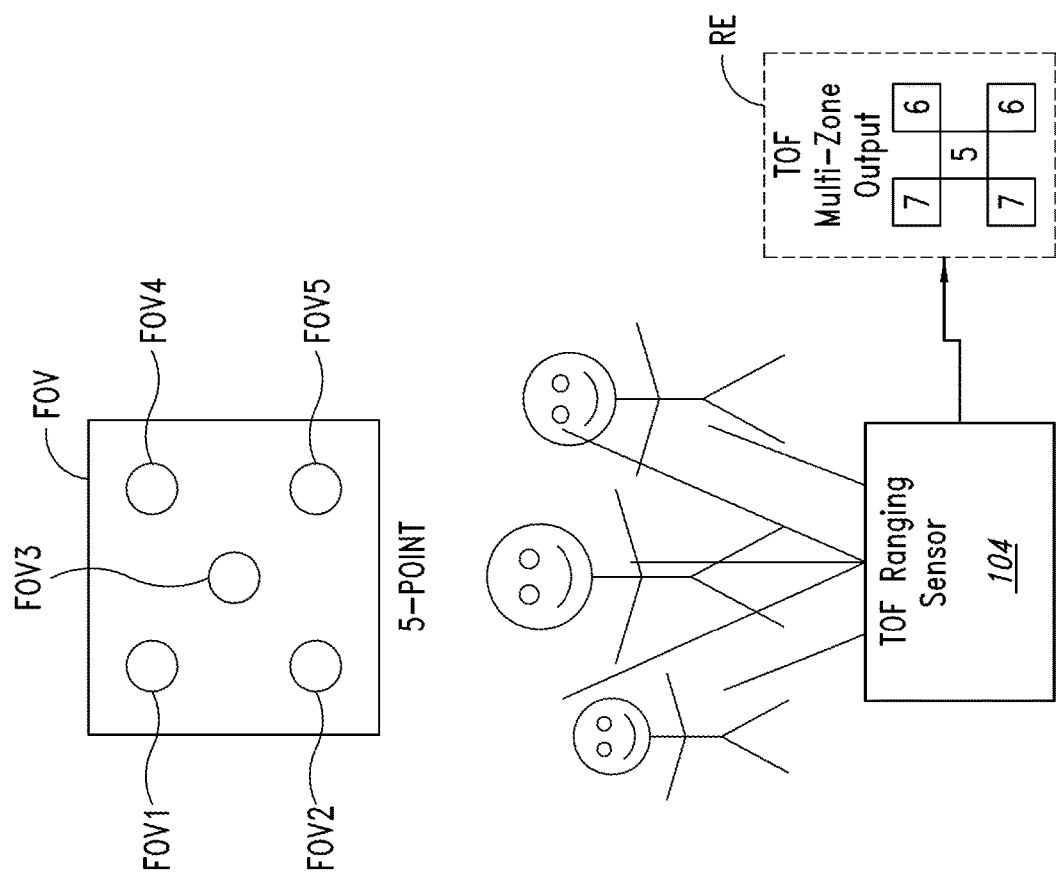

FIG. 10A illustrates the five fields of view FOV1-FOV5 within an overall field of view FOV for the TOF ranging sensor 104 in the embodiment of FIG. 9. In the arrangement of spatial zones or sub fields of view FOV1-FOV5 of FIG. 10A, the processing circuitry 108 can determined whether a person is entering a room by determining whether the sensed distance $D_{TOF}$ for the person first appears in fields of view FOV1, FOV2 or FOV4, FOV5. The speed of the person or object can also be estimated based on how quickly the sensed distance $D_{TOF}$ moves through the fields of view FOV1-FOV5. Multiple people 1000a-c may also be sensed by the multiple zone TOF ranging sensor 104 as show in the figure, with each array zone ZONE (FIG. 4B) providing a sensed distance $D_{TOF}$ to an object or objects in the respective field of view FOV1-FOV5.

Example generated distances $D_{TOF}$ are shown for the range estimation signal RE generated by the TOF ranging sensor 104 in the embodiment of FIG. 10A. The TOF ranging sensor 104 generates a range estimation signal RE1-RE5 for each array zone ZONE, and each array zone includes a number representing the sensed a distance $D_{TOF}$ for that array zone. Thus, in the example of FIG. 10A, the array zones on the left associated with fields of view FOV1, FOV2, include the number "7" since the distance to the smallest person 1000c (i.e., longest sensed distance $D_{TOF}$) sensed by these fields of view is larger than the sensed distances in the other fields of view. The array zone in the middle associated with field of view FOV3 includes the number "5" since the distance to the tallest person 1000a (i.e., shortest distance $D_{TOF}$) is sensed by this field of view and is smaller than the sensed distances in the other fields of view. The array zones on the right associated with fields of view FOV4, FOV5, include the number "6" since the distance to the middle person 1000c (i.e., sensed distance $D_{TOF}$ is between the longest and shortest sensed distances) sensed by these fields of view is between than the sensed distances in the other fields of view. The numbers 5, 6 and 7 were chosen simply to represent the concepts described above for the embodiment of FIG. 10A and these values have no absolute significance.

FIG. 10B illustrates another multiple zone embodiment of the TOF ranging sensor 104 including nine subfields of view FOV1-FOV9 arranged as shown within an overall field of view FOV of the sensor. Other multiple zone embodiment of the TOF ranging sensor 104 include different numbers of subfields of view and different arrangements of the subfields of view within the overall field of view.

As mentioned above, the specific peripheral components 110 and specific control implemented by the processing circuitry 108 will of course depend on the particular use or application of the smart system including the user identification based control system 100. The above examples are based upon a smart home system where it may be assumed that a relatively small number of people, namely the family living in the house, will typically be present for detection and control purposes. In other use cases or types of context aware smart systems the type of peripheral components 114 will of course vary along with the specific control implemented by the processing circuitry 108 utilizing the range estimation signal RE generated by the TOF ranging sensor 104.

Where the user identification based control system 100 is part of a smart office system, for example, the overall functionality of the processing circuitry 108 will of course be different. In a smart office application, for example, a relatively large number of people may possibly be entering a room as opposed to a relatively small number of people in a typical family smart home system. As a result, the processing circuitry 108 may not be able to reliably identify a person entering or exiting a room based solely on the detected height and speed of a given person. In such a situation the processing circuitry 108 may then utilize the image capture device 110 and thermal sensors 112 to help identify the detected person. The TOF ranging sensor 104 in this case effectively functions as a presence detection component with the RE signal indicating that a person has entered the room via the entranceway 102 and allowing the processing circuitry 108 to thereafter utilize the image capture device 110, thermal sensors 112, and possibly other types of identification devices like iris scanning devices to identify the person.

Another example use case is in a secure room or area within a business. In such a situation, when the processing circuitry 108 is unable to detect the identity of a person entering the secure room through the parameters derived from the range estimation signal RE provided by the TOF ranging sensor 104, the processing circuitry will once again utilize other means to identify the person and verify that the person is authorized to be in the secure room. The processing circuitry 108 may in such a situation activate the image capture device 110 to capture images of the face of the person in the room and thereafter utilize facial recognition to identify the person. Alternatively, the processing circuitry 108 could utilize a sound system in the secure room to play an instruction to the person to position themselves proximate an iris scanning device contained in the room for identification and authorization purposes. If in either situation the processing circuitry 108 determines the person is not authorized to be in the secure room, the processing circuitry may sound an alarm and notify security personnel of an unauthorized individual in a particular secure room or area and identify the area for security personnel.

In the example embodiments of FIGS. 1 and 8-10, the user identification based control system 100 includes the TOF ranging sensor 104 positioned on a top of a doorway or entranceway to a room. The specific location of the TOF ranging sensor 104 varies in different embodiments of the present disclosure. The TOF ranging sensor 104 could, for example, be positioned on a ceiling of a room, on a ceiling of a hallway, or otherwise positioned within a structure to sense distances $D_{TOF}$ and signal amplitudes SA based on user characteristics which may then be utilized by the processing circuitry 108 to reliably identify users of the system. In general, the TOF ranging sensor 104 is positioned so that the TOF ranging sensor senses a distance $D_{TOF}$ to a person that is a function of the height of the person. Thus, the TOF ranging sensor 104 is positioned to have a field of view of an area of a room or an entranceway to a room that enables the sensor to sense distances to persons that are related to heights of the persons so that the user identification based control system 100 including the sensor can identify the person based upon the sensed height. In addition, other embodiments of the user identification based control system 100 include multiple TOF ranging sensors 104 positioned on a top of a doorway or entranceway to a room. In such an embodiment the multiple TOF ranging sensor 104 are configured to function in an analogous manner to the multiple zone embodiments of FIGS. 9 and 10.

The processing circuitry 108 may also use the thermal sensors 112, or other types of sensors, to distinguish people from objects. For example, a person carrying a chair into a room could be sensed by the thermal sensors 112 as only a single person passing through the entranceway 102 and not multiple people since the chair could result in a detected distance $D_{TOF}$ to the chair from the TOF ranging sensor 104 that could correspond to a height of a person configured in the control system 100. As mentioned above, the processing circuitry 108 could utilize the detected speed of a person provided by the TOF ranging sensor 104 where identification is not possible based on detected height alone. If the same height and same speed are detected for multiple persons, the processing circuitry 108 may then utilize the image capture device 110 to capture images of the people's faces and perform facial recognition to identify the people.

The control functions performed by the system 100 may vary widely as already discussed above. In a smart home use case or application of the control system 100, the processing circuitry 108 could notify the owner of the house if a person of a new height is detected by the TOF ranging sensor 104. Such a person could, for example, be a guest, a thief, a girl wearing high heels instead of flat shoes. Through controlling the peripheral components 110 the processing circuitry 108 could also control greeting messages customized to the people identified as entering or leaving a the room.

While in the present description embodiments are described including a ranging device in the form of a SPAD array, the principles of the circuits and methods described herein for calculating a distance to an object could be applied to arrays formed of other types of photon detection devices.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A user identification based control system, comprising:
a time of flight ranging sensor configured to sense a distance to a person, wherein the time of flight ranging sensor is positioned so the sensed distance is a function of a height of the person; and
processing circuitry coupled to the time of flight ranging sensor, the processing circuitry configured to:
determine a height of the person based upon the sensed distance, the processing circuitry configured to determine the height of the person when the person is alone and when the person is in a group of people,
uniquely identify the person based on the determined height of the person, and
generate control signals to control peripheral components based upon the identity of the person.

2. The user identification based control system of claim 1, wherein the time of flight ranging sensor has a field of view and wherein the processing circuitry is further configured to determine a speed of the person based upon a duration that the sensed distance to the person is present in the field of view, and the processing circuitry further configured to identify the person based upon the determined speed.

3. The user identification based control system of claim 1, wherein the time of flight ranging sensor has a plurality of fields of view and wherein the processing circuitry is further configured to determine a speed of the person based upon propagation of the sensed distance to the person through the plurality of field of view.

4. The user identification based control system of claim 1, wherein the time of flight ranging sensor is configured to sense distances to a plurality of persons in a field of view of the time of flight ranging sensor.

5. The user identification based control system of claim 4, wherein the time of flight ranging sensor has a plurality of fields of view and is configured to sense distances to multiple persons with each of the plurality of fields of view.

6. The user identification based control system of claim 5, wherein the time of flight ranging sensor includes a single photon avalanche diode array having a plurality of array zones, each array zone associated with a correspond one of the plurality of fields of view.

7. The user identification based control system of claim 1 further comprising at least one additional user identification related device.

8. The user identification based control system of claim 7, wherein the at least one user identification related device comprises at least one of an image capture device or a thermal sensor.

9. The user identification based control system of claim 1, wherein the processing circuitry is configured to identify the person based upon the sensed distance by subtracting the sensed distance from a height at which the time of flight sensor is positioned over a surface on which the person is present.

10. A user identification based control system, comprising:
a time of flight ranging sensor positioned at a top of an entranceway to a room, the time of flight range detection circuit configured to detect a distance to a person passing through the entranceway and further configured to generate a range estimation signal indicating the detected distance;
processing circuitry coupled to the time of flight ranging sensor, the processing circuitry configured to determine a height of the person based on the range estimation signal, uniquely identify the person based on the determined height of the person, and generate controls signals based upon the identified person, wherein the processing circuitry configured to determine the height of the person when the person is alone and when the person is in a group of people; and
a plurality of peripheral components coupled to the processing circuitry to receive the control signals.

11. The user identification based control system of claim 10, wherein the entranceway is a doorway of the room.

12. The user identification based control system of claim 10, wherein the top of the entranceway is the ceiling of the room.

13. The user identification based control system of claim 10 further comprising a plurality of user identification related devices including at least one of an image capture device or a thermal sensor.

14. The user identification based control system of claim 10, wherein the time of flight sensor further comprises:
- a light source configured to transmit an optical pulse signal; and
- a return array of light sensors, the return array of light sensors configured to receive return optical pulse signals corresponding to portions of the transmitted optical pulse signal that reflect off the person.

15. The user identification based control system of claim 14, wherein the light source comprises a vertical-cavity surface-emitting laser and wherein the return array of light sensors comprises an array of single photon avalanche diodes.

16. The user identification based control system of claim 14, wherein the return array comprises a plurality of array zones.

17. A method of identifying a person, the method comprising:
- transmitting an optical pulse signal from a height over the person;
- receiving return optical pulse signals corresponding to portions of the transmitted optical pulse signal that reflect off the person;
- determining a distance between the height and the person based upon a time of flight of the transmitted and return optical pulse signals;
- determining a height of the person based upon the determined distance irrespective of whether the person is alone or is in a group of people; and
- uniquely identifying the person based upon the determined height.

18. The method of identifying a person of claim 17, wherein receiving return optical pulse signals comprises receiving the return optical pulse signals from a plurality of fields of view.

19. The method of identifying a person of claim 17 further comprising determining a signal amplitude of the return optical pulse signals, and wherein identifying the person further comprise identifying the person based upon the determined signal amplitude.

20. The method of identifying a person of claim 17 further comprising determining a speed of the person based upon the transmitted optical pulse signal and return optical pulse signals, and wherein identifying the person further comprise identifying the person based upon the determined speed of the person.

21. The method of identifying a person of claim 17, further comprising:
- authorizing entry of the person into a secure room in response to the uniquely identifying the person.

* * * * *